(12) United States Patent
Mazuir et al.

(10) Patent No.: US 12,017,518 B1
(45) Date of Patent: Jun. 25, 2024

(54) SYSTEM AND METHOD FOR DYNAMIC PRIVACY AND WINDOW TINTING

(71) Applicant: Apple Inc., Cupertino, CA (US)

(72) Inventors: Clarisse Mazuir, San Jose, CA (US); Budhadipta Dan, San Jose, CA (US); Khadijeh Bayat, Santa Clara, CA (US); Matthew E. Last, San Jose, CA (US); Ryan J. Garrone, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 912 days.

(21) Appl. No.: 17/073,740

(22) Filed: Oct. 19, 2020

Related U.S. Application Data

(63) Continuation of application No. 15/366,671, filed on Dec. 1, 2016, now Pat. No. 10,843,535.

(60) Provisional application No. 62/261,747, filed on Dec. 1, 2015.

(51) Int. Cl.
  *B60J 3/04* (2006.01)
  *E06B 3/67* (2006.01)
  *E06B 9/24* (2006.01)
  *G02F 1/137* (2006.01)

(52) U.S. Cl.
  CPC .............. *B60J 3/04* (2013.01); *E06B 3/6722* (2013.01); *E06B 9/24* (2013.01); *G02F 1/13725* (2013.01); *E06B 2009/2464* (2013.01)

(58) Field of Classification Search
  CPC .. B60J 3/04; E06B 3/6722; E06B 9/24; E06B 2009/2464; G02F 1/13725
  See application file for complete search history.

(56) References Cited

U.S. PATENT DOCUMENTS

| | | | |
|---|---|---|---|
| 3,961,181 | A | 6/1976 | Golden |
| 5,025,602 | A | 6/1991 | Baughman et al. |
| 5,390,045 | A | 2/1995 | Bernard, Jr. |
| 5,424,898 | A | 6/1995 | Larson et al. |
| 5,834,765 | A | 11/1998 | Ashdown |
| 6,493,128 | B1 | 12/2002 | Agrawal et al. |
| 6,819,367 | B1 | 11/2004 | Cava |

(Continued)

FOREIGN PATENT DOCUMENTS

| | | | |
|---|---|---|---|
| DE | 102010053036 A1 * | 6/2011 | ............... B60J 3/04 |
| DE | 102011009229 A1 | 7/2012 | |
| WO | 2014/108771 A2 | 7/2014 | |

OTHER PUBLICATIONS

Cadavid, Steven, et al., "Automated Classfication of Gaze Direction Using Spectral Regression and Support Vector Machine", 2009 3rd International Conference on Affective Computing and Intelligent Interaction and Workshops, IEEE, 2009.

(Continued)

*Primary Examiner* — Isaac G Smith
*Assistant Examiner* — Nikki Marie M Molina
(74) *Attorney, Agent, or Firm* — Young Basile Hanlon & MacFarlane, P.C.

(57) ABSTRACT

A processor and a non-transitory computer-readable medium store instructions that, when executed by the processor, cause the processor to perform operations including receiving a location; in response to determining that the location is known, setting a first tinting level of a surface; and in response to determining that the location is unknown, setting a second tinting level of the surface that differs from the first tinting level.

20 Claims, 6 Drawing Sheets

(56) References Cited

U.S. PATENT DOCUMENTS

| | | | |
|---|---|---|---|
| 6,974,940 B2 | 12/2005 | Su et al. | |
| 7,576,727 B2 | 8/2009 | Bell | |
| 8,044,784 B2 | 10/2011 | Ghannam et al. | |
| 8,102,586 B2 | 1/2012 | Albahri | |
| 8,380,393 B1 | 2/2013 | Ohtomo | |
| 8,608,317 B2 | 12/2013 | Babst et al. | |
| 8,707,216 B2 | 4/2014 | Wilson | |
| 8,781,676 B2* | 7/2014 | McIntyre, Jr. | B60J 3/04 296/211 |
| 2003/0169213 A1 | 9/2003 | Spero | |
| 2003/0210355 A1 | 11/2003 | Dao | |
| 2005/0231336 A1* | 10/2005 | Strohband | B32B 17/10532 340/426.27 |
| 2007/0126255 A1 | 6/2007 | Mitsui | |
| 2007/0176402 A1 | 8/2007 | Irie et al. | |
| 2008/0112175 A1 | 5/2008 | Bucher | |
| 2009/0116098 A1 | 5/2009 | Chang | |
| 2010/0065721 A1 | 3/2010 | Broude et al. | |
| 2010/0094501 A1 | 4/2010 | Kwok | |
| 2010/0295670 A1 | 11/2010 | Sato et al. | |
| 2011/0008062 A1 | 1/2011 | Ashdown | |
| 2012/0330173 A1 | 12/2012 | Park et al. | |
| 2013/0016070 A1 | 1/2013 | Starner et al. | |
| 2013/0030645 A1 | 1/2013 | Divine et al. | |
| 2014/0202643 A1 | 7/2014 | Hikmet et al. | |
| 2014/0249718 A1 | 9/2014 | Liu et al. | |
| 2014/0276090 A1 | 9/2014 | Breed | |
| 2014/0293188 A1 | 10/2014 | Chen et al. | |
| 2014/0320755 A1 | 10/2014 | Martinez et al. | |
| 2015/0002563 A1 | 1/2015 | Chen et al. | |
| 2015/0002781 A1 | 1/2015 | Ma | |
| 2015/0057896 A1 | 2/2015 | Yamane et al. | |
| 2015/0077555 A1 | 3/2015 | Scalisi | |
| 2015/0210287 A1* | 7/2015 | Penilla | B60W 40/08 701/49 |
| 2015/0253594 A1 | 9/2015 | Roberts et al. | |
| 2016/0041317 A1 | 2/2016 | Kim et al. | |
| 2016/0077400 A1 | 3/2016 | Lam et al. | |
| 2016/0176372 A1 | 6/2016 | Kim | |
| 2016/0314763 A1 | 10/2016 | Matthews | |
| 2017/0073075 A1 | 3/2017 | Gagnon et al. | |
| 2017/0101032 A1 | 4/2017 | Sugioka et al. | |
| 2017/0329161 A1 | 11/2017 | Baker et al. | |
| 2018/0079284 A1 | 3/2018 | Choi et al. | |
| 2019/0366811 A1* | 12/2019 | O'Keeffe | B60J 3/04 |

OTHER PUBLICATIONS

Siler, Wes., "Mercedes Dual-View Front Seat Screen Finally US-Bound", Jalopnik, Car Gadgets, Dec. 9, 2009 (8 pp).

SageGlass, Product Highlights, Sage Electrochromics, 2015 (2 pp).

* cited by examiner

SYSTEM AND METHOD FOR DYNAMIC PRIVACY AND WINDOW TINTING

CROSS-REFERENCE TO RELATED APPLICATION

This application is a continuation of U.S. patent application Ser. No. 15/366,671, filed Dec. 1, 2016, entitled "SYSTEM AND METHOD FOR DYNAMIC PRIVACY AND WINDOW TINTING," which is related to and claims priority under 35 U.S.C. § 119(e) to U.S. Patent Application No. 62/261,747, filed Dec. 1, 2015, entitled "SYSTEM AND METHOD FOR DYNAMIC PRIVACY AND WINDOW TINTING," the entire contents of which are incorporated herein by reference.

FIELD

The described embodiments relate generally to an environment with dynamic privacy and tinting. More particularly, the embodiments relate to adjustable and dynamic tinting of transparent portions of an environment.

BACKGROUND

An environment may have windows that do not adequately protect and shield occupants from sunlight and other forms of light exterior to the environment. In addition, conventional environments do not provide occupants with adequate privacy. Conventional windows have static light transmittance and cannot adapt to occupants of the environment, current conditions associated with weather or lighting, and actions of the occupants. In short, conventional exterior facing surfaces with static light transmittance would benefit from many improvements.

SUMMARY

A system includes an environment such as a vehicle with a computing device and tinting hardware modules. Briefly described, and according to one embodiment, aspects of the present disclosure generally relate to systems and methods for providing adjustable exterior facing surfaces having adjustable tint film that utilize sensors and imaging devices of the vehicle to intelligently tint the adjustable exterior facing surfaces and protect, shield, or obstruct a particular object, location, or zone within an interior of the vehicle.

According to one embodiment, a vehicle includes a processor and a non-transitory computer-readable medium storing instructions that, when executed by the processor, cause the processor to perform operations including receiving a location of the vehicle; in response to determining that the location is known to the vehicle, setting a first tinting level of a surface of the vehicle; and in response to determining that the location is unknown to the vehicle, setting a second tinting level of the surface of the vehicle that differs from the first tinting level.

According to a further embodiment, a method includes, in response to identifying that a vehicle is parked, setting a first tinting level of an exterior surface of the vehicle; and in response to detecting that a user of the vehicle is approaching the vehicle while the vehicle is parked, setting a second tinting level of the exterior surface of the vehicle, wherein the first tinting level differs from the second tinting level.

According to another embodiment, an apparatus includes a processor configured to determine, based on information from sensors of a vehicle, that the vehicle is approaching a location experiencing a weather condition; in response to determining that less ambient light will enter the vehicle due to the weather condition than enters at a current location of the vehicle, determine a tinting control signal to allow more ambient light to enter the vehicle through an exterior facing surface of the vehicle at the location experiencing the weather condition; and send a command to a tinting module to adjust a voltage level of an adjustable tint film to control a tinting level of the exterior facing surface of the vehicle based on the tinting control signal.

These and other aspects, features, and benefits of the present disclosure will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

The accompanying drawings illustrate embodiments and/or aspects of the disclosure and, together with the written description, serve to explain the principles of the disclosure. Wherever possible, the same reference numbers are used throughout the drawings to refer to the same or like elements of an embodiment, and wherein.

DETAILED DESCRIPTION

Figure 1A:
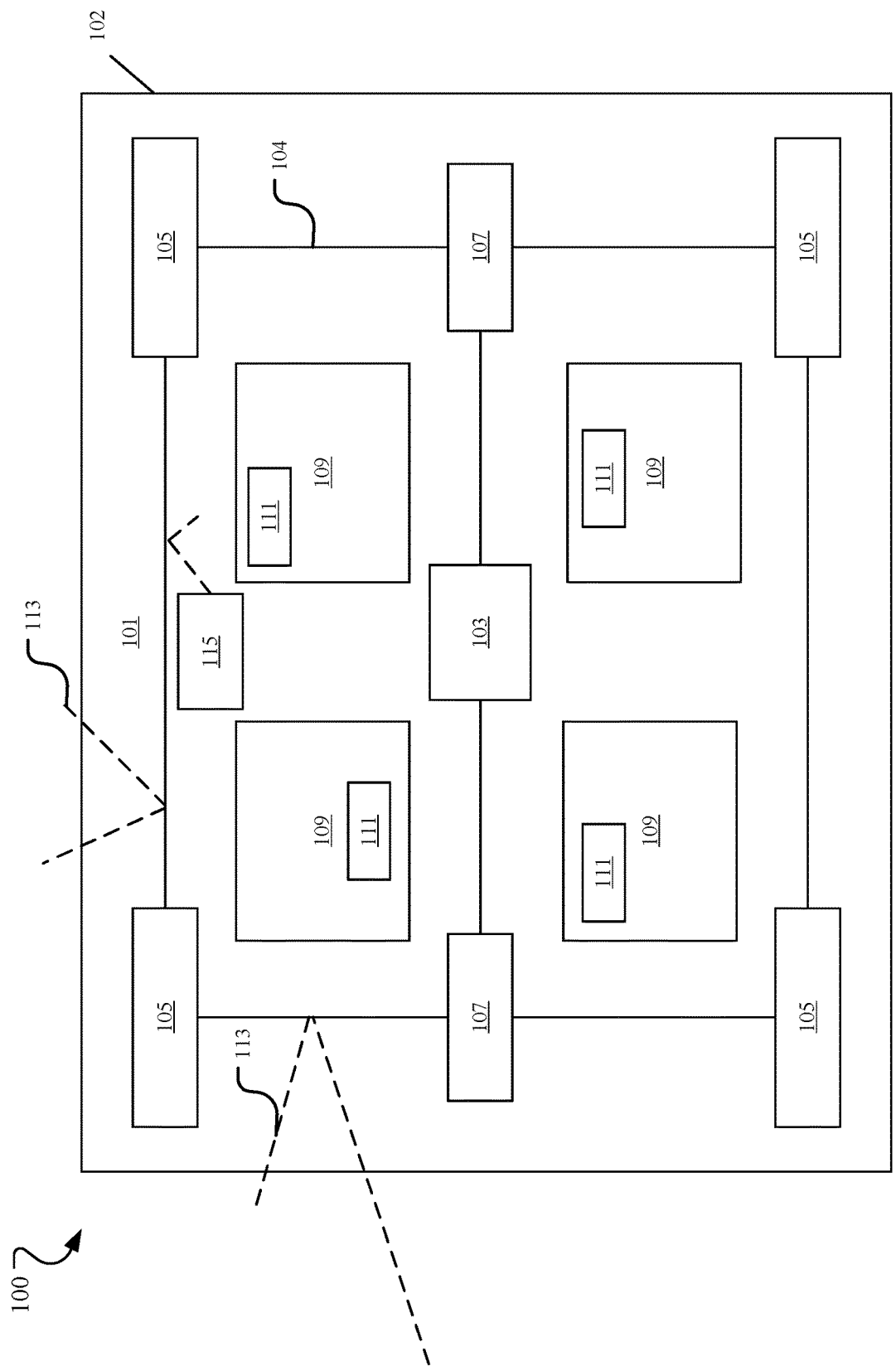
FIG. 1A illustrates a block diagram of a vehicle system according to example embodiments.

According to an example embodiment, a vehicle includes a tinting system that includes components to identify and determine objects, locations, and zones within the vehicle to protect and shield the objects, locations, and zones from sunlight and/or provide privacy by controlling the tint of window systems or otherwise. The tinting system recognizes the objects, locations, and zones within the vehicle to be protected or shielded, and responds to explicit requests or commands for tinting, anticipates implicit requests or commands for tinting, and/or operates to activate tinting functions based on settings and/or sensor inputs. The tinting system automatically adjusts tinting of a window for a location associated with an occupant, an object, or a zone. As a result, the tinting system provides automatic tint adjustment to prevent light from entering the interior of the vehicle to increase the comfort of occupants of the vehicle, provide privacy to the occupants of the vehicle, and reduce light leakage from the interior of the vehicle, among other advantages.

In one embodiment, the tinting system provides adjustable exterior facing surfaces having adjustable tint film that utilize sensors and imaging devices of the vehicle to intelligently tint the adjustable exterior facing surfaces and protect, shield, or obstruct a particular object, location, or zone within an interior of the vehicle. The exterior facing surfaces, which may be a transparent window, may be coated with the adjustable tint film and can have a modifiable level of transmittance that prevents light from entering the interior of the vehicle and/or prevents light from exiting the interior of the vehicle. In another embodiment, the tinting system responds to explicit commands from occupants of the vehicle such as verbal commands, gesture-based commands, and touch-based commands and implicit commands from occupants of the vehicle.

As an example, an occupant of the vehicle may be located in a zone of the vehicle exposed to bright sunlight, which can make driving difficult or uncomfortable. The tinting system may automatically adjust the tint of an adjustable exterior facing surface facing the bright sunlight to allow the occupant of the vehicle to see based on lighting conditions and reduce glare.

As another example, an occupant of the vehicle may be located in a zone of the vehicle at nighttime. The tinting system may automatically adjust the tint level of an adjustable exterior facing surface to allow the occupant to see based on lighting conditions and allow ambient light to enter the vehicle, such as light from streetlights and other vehicles. At the same time, the tinting system may automatically adjust the tint level of an adjustable exterior facing surface in the rear of the vehicle to allow an occupant with their eyes closed or beginning to close to sleep and prevent ambient light from entering the vehicle. Also at the same time, the tinting system may automatically adjust the tint of an adjustable exterior facing surface in the rear of the vehicle to allow an occupant to read a book or watch media on a display within the vehicle and prevent light from exiting the vehicle.

As an additional example, an occupant of the vehicle may be located in a zone of the vehicle exposed to bright sunlight. The vehicle may recognize that the vehicle is about to travel into a tunnel based on the current location of the vehicle. The tinting system may automatically adjust the tint level of an adjustable exterior facing surface in the zone of the vehicle to allow the occupant to see based on lighting conditions and allow ambient light to enter the front of the vehicle.

As another example, an occupant of the vehicle may be located in a zone of the vehicle exposed to bright sunlight. The vehicle may recognize that the vehicle is about to travel into the shade provided by buildings based on a current location of the vehicle and/or based on input received from sensors. The tinting system may automatically adjust the tint level of an adjustable exterior facing surface in the zone of the vehicle to allow the occupant to see based on lighting conditions and allow ambient light to enter the front of the vehicle.

As an even further example, an occupant of the vehicle may be located in a zone of the vehicle exposed to sunlight. The vehicle may recognize that the vehicle is about to travel into an area experiencing a rainstorm or a snowstorm. The tinting system may automatically adjust the tint level of an adjustable exterior facing surface of the vehicle to allow the occupant to see based on lighting conditions and allow ambient light to enter the front of the vehicle.

As a further example, an occupant of the vehicle may be located in a rear zone of the vehicle and attempting to read a document that is difficult to read in bright sunlight. The occupant may be squinting their eyes. The tinting system may automatically adjust the tint of an adjustable exterior facing surface to allow the occupant to more easily read the document. In one example, the tinting system may increase a tinting level to prevent sunlight from entering the interior of the vehicle through the adjustable exterior facing surface.

As another example, an owner of the vehicle may approach the vehicle that is parked in a particular location. The tinting system may automatically adjust the tint of an adjustable exterior facing surface as the owner of the vehicle approaches. When the vehicle is parked, the tinting level may be a first level that is a higher level to obstruct a view of the interior of the vehicle. When the owner arrives at the vehicle, the tinting level may be changed to a second level that is a lower or reduced level, to allow an outside viewer to see into the vehicle. As a further example, the vehicle may be occupied. The vehicle may determine a level of interior light within the vehicle provided by a lighting device and based on the level of interior light within the vehicle, the tinting system may adjust the tint to obstruct a view of an interior of the vehicle.

As an additional example, an occupant of the vehicle may place packages in a rear zone of the vehicle. The tinting system of the vehicle may automatically adjust the tint of the adjustable exterior facing surface to prevent others from viewing the packages in the rear zone of the vehicle.

In a location known to the vehicle (e.g., a parking garage), the vehicle may reduce the tinting level of adjustable exterior facing surfaces associated with all zones within the vehicle. In a location unknown to the vehicle (e.g., a city street), the vehicle may increase the tinting level of an adjustable exterior facing surface in one zone within a front of the vehicle. In addition, in a location known to the vehicle, the vehicle may reduce the tinting level of an adjustable exterior facing surface associated with a storage area of the vehicle. In a location unknown to the vehicle, the vehicle may increase the tinting level of an adjustable exterior facing surface associated with a storage area of the vehicle. The vehicle also may utilize other known factors about the location to adjust the tinting level such as temperature, weather, or crime rate.

The vehicle and the tinting system may also accept a request or command such as gestures captured by imaging devices or touch screens, voice commands captured by microphones, and touch commands received by a touch screen. The tinting system responds to both explicit and implicit commands and controls tinting hardware modules based on the explicit and implicit commands. When an occupant enters the vehicle, the vehicle may determine that the occupant is a known occupant and activate the tinting hardware modules based on tinting personal profile settings associated with the occupant. In particular, this particular occupant may desire that the tinting hardware modules provide higher privacy in the front seats of the vehicle while providing lower privacy to a rear portion of the vehicle.

In a further example, a passenger unknown to the vehicle, but a guest of the occupant, may enter the vehicle and sit in a rear portion of the vehicle. The passenger may be previously unknown to the vehicle, but known to the occupant. The passenger may want to read a map. A known occupant or the unknown passenger may provide an audible command. For example, either may state "vehicle please reduce the tint" and upon recognition of the verbal command, the vehicle may modify a tint level in a rear portion of the vehicle.

While discussed in the context of a vehicle, the system may also be useful for residential building privacy and tinting, office building privacy and tinting, commercial building privacy and tinting, or any other dynamic privacy and tinting environments.

The vehicle and/or a mobile computing device in communication with the vehicle may obtain biometric attributes of a person or occupant, and compare those biometric attributes with stored biometric attributes, using sensors and/or cameras or other imaging devices. The biometric attributes may be stored in memory of the mobile computing device and/or memory of the vehicle. The biometric attributes may be obtained and authenticated when the occupant approaches the vehicle and/or when the occupant is located within the vehicle. For example, the vehicle may determine that the occupant and/or a known mobile computing device is within a particular proximity of the vehicle. When a person has authenticated biometric attributes, the vehicle may adjust the tint level of adjustable exterior facing surfaces when the mobile computing device is within the particular proximity of the vehicle. The adjustable exterior facing surfaces may be associated with particular locations, objects (e.g., a seat), or zones. In certain instances, the vehicle may apply a tint level to a particular zone or zones based on a location of the vehicle.

In a further embodiment, the vehicle may determine that the mobile computing device is within the vehicle or that a particular occupant is within the vehicle and set vehicle personal preferences. According to an example embodiment, the vehicle personal preferences may be associated with tinting profile preferences, seating position, seat heating, seat cooling, steering wheel heating/cooling, and localized climate controls. The tinting system may automatically adjust exterior facing surfaces associated with a particular person sitting in a particular seat.

Users can benefit from use of vehicle personal preferences and personal data provided by the mobile computing device when operating the vehicle. For example, the personal data can be used to provide the vehicle with tinting profile preferences, media, contact lists, navigation locations, navigation settings, energy usage settings, autonomous functionality settings, security settings, other climate control settings, other entertainment settings, and seat settings, among others. Accordingly, use of such personal data enables users to influence and control delivered content, and vehicle operation, among other things.

Users can selectively block use of, or access to, personal data. A system incorporating some or all of the technologies described herein can include hardware and/or software that prevents or blocks access to such personal data. For example, the system can allow users to "opt in" or "opt out" of participation in the collection of personal data or portions thereof. Also, users can select not to provide location information, or permit provision of general location information (e.g., a geographic region or zone), but not precise location information.

Entities responsible for the collection, analysis, disclosure, transfer, storage, or other use of such personal data should comply with established privacy policies and/or practices. Such entities should safeguard and secure access to such personal data and ensure that others with access to the personal data also comply. Such entities should implement privacy policies and practices that meet or exceed industry or governmental requirements for maintaining the privacy and security of personal data. For example, an entity should collect users' personal data for legitimate and reasonable uses, and not share or sell the data outside of those legitimate uses. Such collection should occur only after receiving the users' informed consent. Furthermore, third parties can evaluate these entities to certify their adherence to established privacy policies and practices.

According to exemplary embodiments, the vehicle may provide adjustable, controllable, and dynamic tinting of exterior facing surfaces that respond to explicit and implicit commands. The vehicle does not place a significant burden on the user and offers significant privacy and tinting enhancements and conveniences for occupants of the vehicle.

These and other embodiments are discussed below with reference to FIGS. 1A-5. However, those skilled in the art will readily appreciate that the detailed description given herein with respect to these Figures is for explanatory purposes only and should not be construed as limiting.

FIG. 1A illustrates a block diagram of a vehicle system 100 according to an example embodiment. The vehicle system 100 includes a vehicle 102 having a computing device 103 that is in communication with sensors 107 and tinting hardware modules 105. The sensors 107 may include sensors and imaging devices, among other hardware devices for determining various attributes of the vehicle or occupants. The vehicle 102 may be a machine that transports people and/or cargo including a terrestrial motor vehicle, a watercraft, and an aircraft, among other vehicles. The vehicle 102 may include engines or motors such as an internal combustion engine, an electric motor, or a hybrid configuration.

As shown in FIG. 1A, the vehicle 102 may include zones 109 that may be shielded, protected, and/or obstructed by any given tinting hardware module 105 or combination of modules 105 in combination with adjustable tinting film 104 covering adjustable exterior facing surfaces. The adjustable exterior facing surfaces may be transparent or partially transparent and may include windshields, windows, a roof, a floor, and other surfaces of the vehicle. There may be occupants 111 located in each zone 109. The tinting hardware modules 105 may together operate and control adjustable tint film 104 located within an exterior facing surface that shield and protect particular locations and a particular zone 109 within the vehicle. The adjustable tint film 104 has an adjustable absorption level, among other adjustable and controllable variables.

There may be seats located in each zone 109 among other vehicle components such as a roof, windshields, windscreens, dashboards, windows, mirrors (e.g., mirrors within an interior of the vehicle and mirrors exterior to the vehicle), tables, armrests, and footrests, among other components. In addition, the vehicle components include the computing device 103, the sensors 107, and tinting hardware modules 105 that are to be shielded and protected from different types of light and energy such as solar energy and ultraviolet radiation exterior to the vehicle. These components benefit from being shielded and protected from ultraviolet radiation among other types of radiation exterior to the vehicle. The adjustable exterior facing surface may be changed from translucent to transparent and the adjustable exterior facing surfaces may appear milky, hazy, blurred, darkened, cloudy, and/or fuzzy.

The tinting hardware module 105 may modify the transmittance or the ratio of ultraviolet or visible light that may pass through the adjustable exterior facing surfaces. If all light passes through the adjustable exterior facing surface, then absorbance of the adjustable exterior facing surface is zero and percent transmittance is 100%. However, if all light is absorbed by the adjustable exterior facing surface, then percent transmittance is zero and absorption is infinite. The adjustable exterior facing surface may have modifiable and tunable levels for light reflection, light absorption, and light transmission. As a result, the interior of the vehicle 102 may be kept at a more constant and comfortable temperature and lighting level than conventional vehicles.

The vehicle 102 and the computing device 103 may communicate in various ways or combinations thereof. The vehicle 102 and the computing device 103 may use wired communication methods and Bluetooth, WiFi, or other such short range wireless methods.

The vehicle 102 and the computing device 103 may communicate using a cellular communications network or another communications network. Accordingly, communication may involve the Internet, an intranet, a cellular communications network, a WiFi network, a packet network, a short-range wireless network, or another wired and/or wireless communication network or a combination of any of the foregoing. As an example, the vehicle 102 and the computing device 103 may communicate data in packets, messages, or other communications using a common protocol, e.g., Hypertext Transfer Protocol (HTTP) and/or Hypertext Transfer Protocol Secure (HTTPS). The vehicle 102 and/or the computing device may communicate with other optional server computing devices associated with the vehicle system 100.

The vehicle 102 and/or the computing device 103 may also optionally include Bluetooth® Low Energy (BLE, Bluetooth® LE, Bluetooth® Smart) functionality based on the Bluetooth 4.0 specification or another specification. In addition, the vehicle 102 may include a beacon. According to an example embodiment, the vehicle 102 and the computing device 103 are paired and communicate wirelessly using a short range wireless network, e.g., Bluetooth® (IEEE Standard 802.15). The short range wireless network may be a wireless personal area network (WPAN).

In another example, the vehicle 102 may optionally create a personal area network and/or a mesh network for communicating with the computing device 103. Additionally, the vehicle 102 and the computing device 103 may communicate using Zigbee®, Wi-Fi, near field magnetic inductance, sonic (sound) waves, ultrasound waves, and/or infrared (light) waves, among others.

Figure 1B:
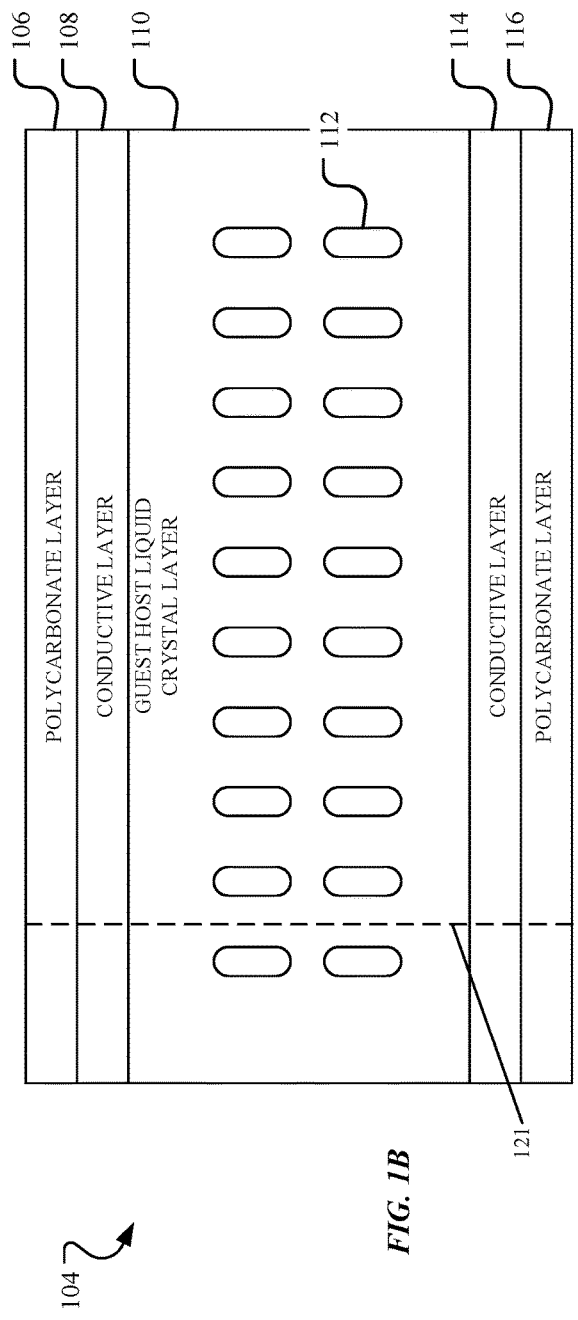
FIG. 1B illustrates a cross-section diagram of an adjustable tint film with dye in a first orientation and FIG. 1C illustrates a cross-section diagram of the adjustable tint film with dye in a second orientation according to example embodiments.
Figure 1C:
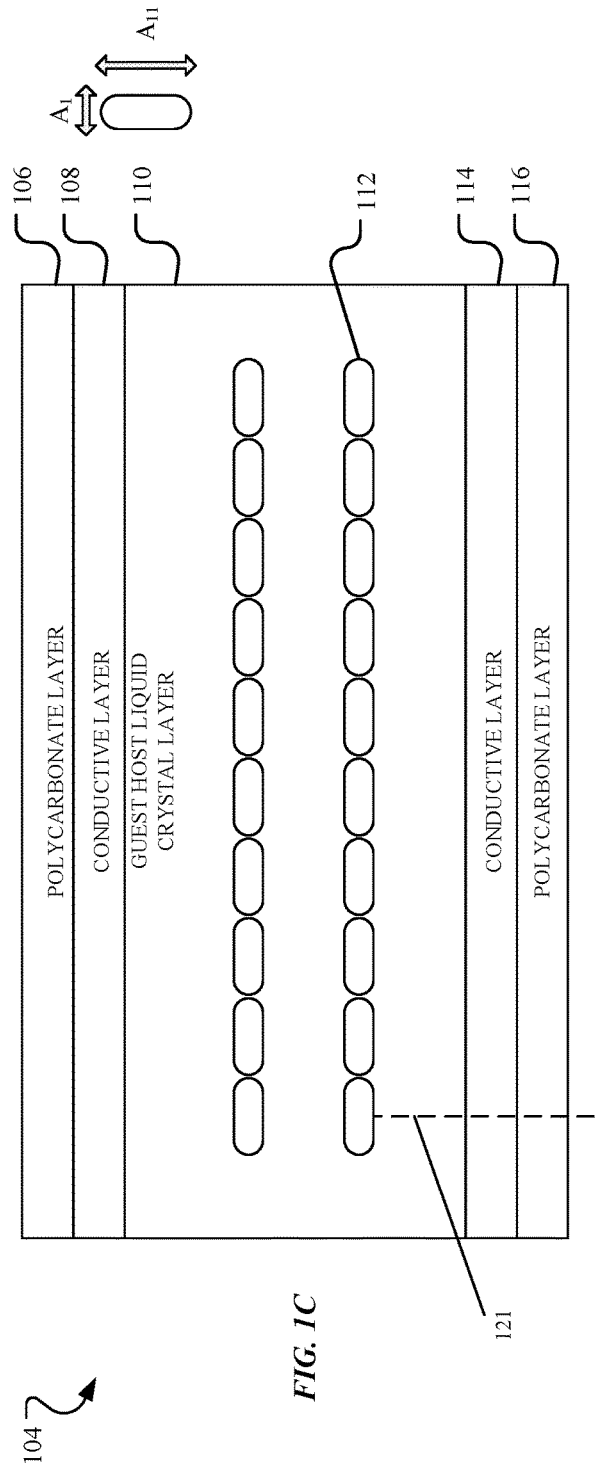

FIGS. 1B and 1C illustrate a cross-section of adjustable tint film 104 according to an example embodiment. As shown in FIGS. 1B and 1C, the adjustable tint film 104 may include a first polycarbonate layer 106 that covers a first conductive layer 108. In addition, the adjustable tint film 104 may include a second polycarbonate layer 116 that covers a second conductive layer 114. Between the first conductive layer 108 and the second conductive layer 114, there is a guest host liquid crystal layer 110. This guest host liquid crystal layer is transparent but also includes a dye 112 that is aligned with the liquid crystal. The dye 112 is not limited to having any particular color. The color may be a neutral color, such as a grayish color. Based on an orientation of the dye, the adjustable tint film 104 may control a level of light 121 absorption. A voltage may be applied to the guest host liquid crystal layer 110 and an orientation of the dye 112 may be modified. In an exemplary embodiment, at a first voltage level, the orientation of the dye may be vertical as shown in FIG. 1B.

At a second voltage level, the orientation of the dye may be opposite from the first voltage level or horizontal, as shown in FIG. 1C. The orientation of the dye may be controlled based on the current state of the vehicle and based on explicit commands and implicit commands. The orientation of the dye may be modified in 25 milliseconds. In one example, the level of light 121 absorption of the dye in a first axis Ai may be higher than the level of light 121 absorption of the dye in a second axis Au.

In a further embodiment, the liquid crystal may be a different type of liquid crystal such as collistic liquid crystal. In an even further embodiment, the adjustable tint film 104 may be an adjustable polymer film and/or have an adjustable polymer film coating. The adjustable polymer film may include droplets of dye that scatter light 121 in a different way than the dye in the guest host liquid crystal layer. The droplets may be randomly arranged at a first voltage level and may scatter light 121 as it passes through. However, at a second voltage level, the droplets may align and allow light 121 to pass through. The adjustable polymer film may be used as low emission or low-e film to reduce heat gain from solar energy and prevent heat loss from an interior of the vehicle. In addition, the adjustable polymer film may prevent infrared radiation and provide temperature control.

In one embodiment, an exterior facing surface of the vehicle may include a first layer of glass, a first bonding layer, the adjustable tint film 104 as shown in FIGS. 1B and 1C, a second bonding layer, and a second layer of glass. Thus, the adjustable tint film 104 may be located between the first layer of glass and the second layer of glass. The first layer of glass and/or the second layer of glass may be laminated safety glass or another type of glass. The first bonding layer and/or the second bonding layer may be polyvinyl butyral or PVB.

Figure 2:
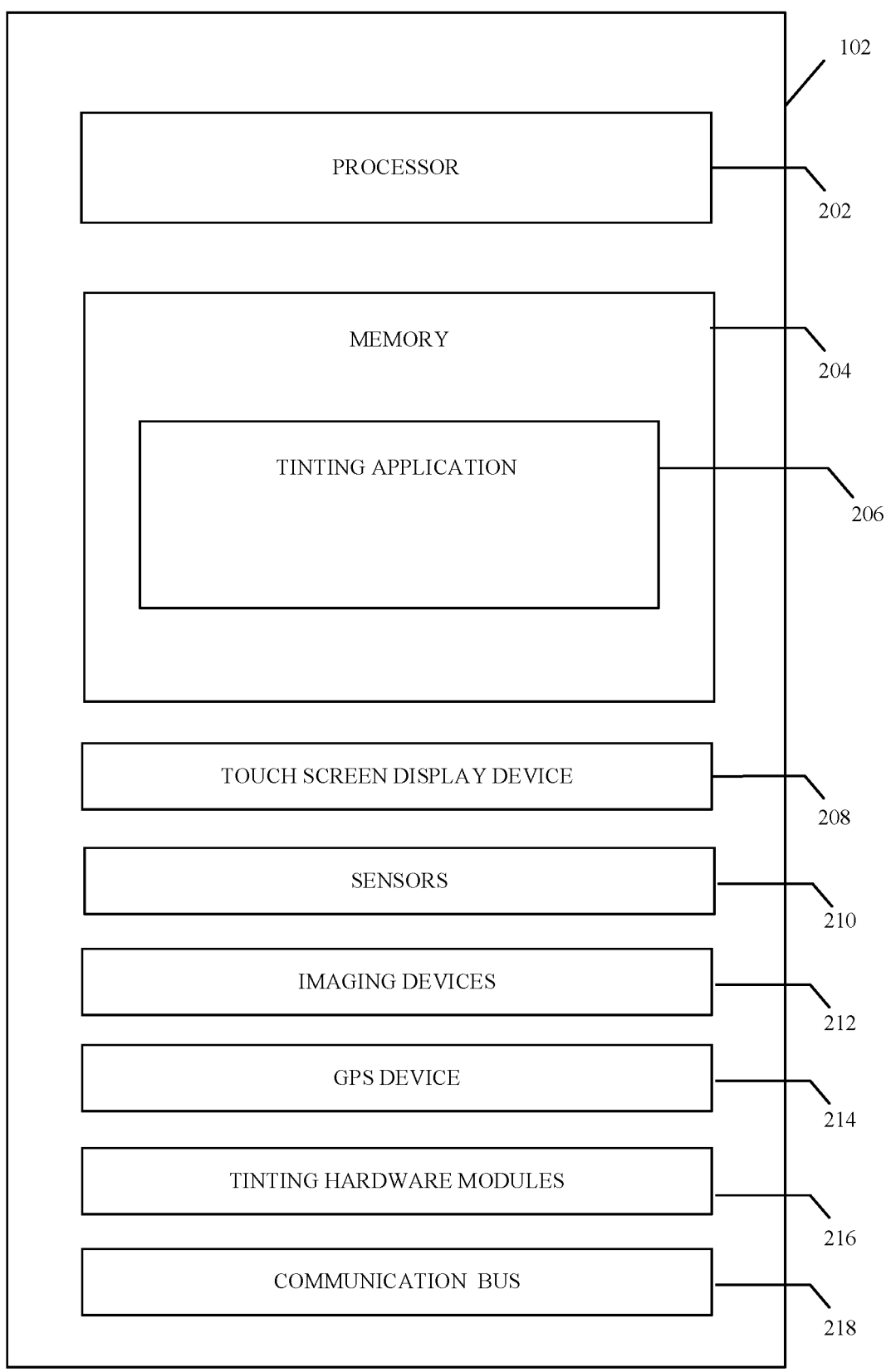
FIG. 2 illustrates a block diagram of a vehicle computing system according to an example embodiment.

FIGS. 1A and 2 illustrate a block diagram of the vehicle 102 according to an example embodiment. The vehicle 102 may include a computing device having hardware components including a processor 202 and memory 204, such as a vehicle onboard computer or a dedicated electronic device having a processor and memory. The processor 202 processes machine/computer-readable executable instructions and data, and the memory 204 stores machine/computer-readable executable instructions and data including applications, including a vehicle tinting application 206 for controlling the adjustable tint film 104. The processor 202 and memory 204 are hardware. The processor 202 may be a hardware processing unit. In one embodiment, the processor 202 includes a secure enclave processor (SEP). The SEP stores and protects information used for identifying known mobile computing devices, biometric information, and tinting preference profiles for occupants, among other information. The memory 204 includes random access memory (RAM) and non-transitory memory, e.g., a non-transitory computer-readable storage medium such as flash storages or hard drives. The non-transitory memory may include any tangible computer-readable medium including, for example, magnetic and/or optical disks, flash drives, and the like.

The vehicle 102 further can include touch screen display devices 208, such as a liquid-crystal display (LCD) for receiving input and displaying output, sensors 210, cameras or imaging devices 212, a global positioning system (GPS) device 214, tinting hardware modules 216, and a communication bus 218. The vehicle 102 may include other wireless communication devices for communicating including a wireless transceiver, a cellular transceiver, a Bluetooth transceiver, and others.

The touch screen display devices 208 may be located on an exterior of the vehicle 102 and/or an interior of the vehicle for receiving input and displaying output including tinting control buttons. The tinting control buttons may be provided by a user interface of the vehicle 102 and/or a user interface of a mobile computing device in communication with the vehicle 102. For example, the touch screens 208 may be located within an interior of the vehicle. The sensors 210 and the imaging devices 212 may be used for biometric identification and authentication. The sensors 210 may be located on the exterior of the vehicle and/or the interior of the vehicle and include fingerprint sensors, iris recognition devices, eye vein verification devices, microphones, seat pressure sensors, load or weight sensors (e.g., a strain gauge), pressure sensors, thermometers, barometers, precipitation sensors, ambient light sensors (ALS), electrocardiogram (ECG) sensors, and infrared (IR) antennas, among others. The sensors 210 may be coupled with the processor 202 for obtaining biometric information.

The imaging devices 212 may be coupled with the processor 202 for facial recognition and may recognize facial expressions and may be used to determine whether an occupant is squinting, has their eyes closed, or is beginning to close to their eyes, among other things. The imaging devices 212 include high-definition cameras and may be used to determine two-dimensional images and/or three-dimensional images including a two-dimensional image of a face or a three-dimensional image of a face, a height of a person, a body shape of a person, or a gait of a person. The imaging devices 212 may be located on an exterior of the vehicle and/or an interior of the vehicle. In one example, each seat within the vehicle may include imaging devices to capture a face of a passenger sitting in that particular seat. The touch screen display devices 208 and/or the imaging devices 212 may be used to receive tinting control input regarding an object, zone, location, or protection/privacy area and gestures, such as a pinch, pull, zoom, or a gesture pointing to an object, zone, location, or protection/privacy area, among other gestures. The microphones may be used to receive verbal commands such as tinting control related to an object, location, zone, or protection/privacy area.

The global positioning system device 214 may receive GPS signals and thereby determine a current location of the vehicle 102. The tinting hardware modules 216 may include one first tinting hardware module located in a front-right portion of the vehicle 102, one second tinting hardware module located in a front-left portion of the vehicle 102, one third tinting hardware module located in a rear-right portion of the vehicle 102, and a fourth tinting hardware module located in a rear-left portion of the vehicle 102. However, the tinting hardware modules 216 may be arranged in other ways such that the tinting hardware modules 216 adequately protect and shield occupants of the vehicle and provide occupants of the vehicle with privacy. The vehicle 102 may include more than four tinting hardware modules 216 or less than four tinting hardware modules 216.

The vehicle 102 may be in communication with other computing devices such as mobile computing devices carried by occupants of the vehicle. The mobile computing device may be a computer having a processor and memory, such as a laptop, desktop, tablet computer, mobile computing device (e.g., a smartphone), a wearable device (e.g., a watch), or a dedicated electronic device having a processor and memory. The processors process machine/computer-readable executable instructions and data, and the memory stores machine/computer-readable executable instructions and data including applications, such as a client application that communicates with vehicle tinting application 206. The processor and memory are hardware. The processor may be a hardware processing unit. In one embodiment, the processor includes a secure enclave processor (SEP). The SEP stores and protects biometric information and tinting preference profile information, among other information. The memory includes random access memory (RAM) and non-transitory memory, e.g., a non-transitory computer-readable storage medium such as flash storages or hard drives. The non-transitory memory may include any tangible computer-readable medium including, for example, magnetic and/or optical disks, flash drives, and the like.

The mobile computing device further includes a touch screen display device such as a liquid-crystal display (LCD) to receive input and display output, sensors such as an ambient light sensor, an accelerometer, a gyroscopic sensor, microphones, a magnetometer, a barometer, and a fingerprint sensor, cameras or imaging devices, a GPS device, and a communication bus. The mobile computing device may include other wireless communication devices for communicating including a wireless transceiver, a cellular transceiver, a Bluetooth transceiver, and others.

The touch screen display device receives input and displays output. The sensors and the imaging devices may be used for biometric identification and authentication. The sensors may be in communication with the processor 202 for obtaining biometric information. The imaging devices may include high-definition cameras and may be used to determine two-dimensional images and/or three-dimensional images including a two-dimensional image of a face or a three-dimensional image of a face, a height of a person, a body shape of a person, or a gait of a person. The touch screen display device and/or the imaging devices may be used to receive gestures. The microphones may be used to receive verbal commands. The global positioning system device may continually determine a current location of the mobile computing device.

The vehicle tinting application 206 may have a component of an application and/or service executable by the vehicle 102 and/or the mobile computing device. For example, the vehicle tinting application 206 may be a single unit of deployable executable code. According to one aspect, the vehicle tinting application 206 may be a web application, a native application, and/or a mobile application (e.g., an app) downloaded from a digital distribution application platform that allows users to browse and download applications developed with mobile software development kits (SDKs).

As an example, the vehicle 102 may receive a communication from a known mobile computing device, determine, by a sensor 210, biometric information associated with a known occupant, grant access to the vehicle 102, and set vehicle personal preferences including tinting preferences based on the communication and the biometric information. The biometric information may be facial recognition information and/or another type of biometric information. The vehicle 102 may unlock doors and extend welcome functions including external lighting, internal lighting, cabin configuration such as tinting and privacy settings of the exterior facing surfaces, and other welcome functions. The vehicle may illuminate the external lighting and/or the internal lighting when the occupant 111 and/or the mobile computing device is a particular distance from the vehicle, e.g., one meter. In addition, the vehicle 102 may modify a tint level of the adjustable tint film 104 of the exterior facing surfaces when the occupant 111 and/or the mobile computing device is the particular distance from the vehicle. The particular distance may be modified and may be based on a particular location of the vehicle 102.

In another example, a person 111 may touch a door handle or door of the vehicle 102 to provide the biometric authentication information. The door handle or the door may have a fingerprint sensor for obtaining a fingerprint and/or other sensors for obtaining other signals. The vehicle 102 may then compare the biometric information associated with the person 111 with biometric attributes stored in memory 204 of the vehicle 102 and/or memory of the mobile computing device. The person 111 may enter the vehicle 102 and sit in a driver/operator seat or a passenger seat.

Figure 3:
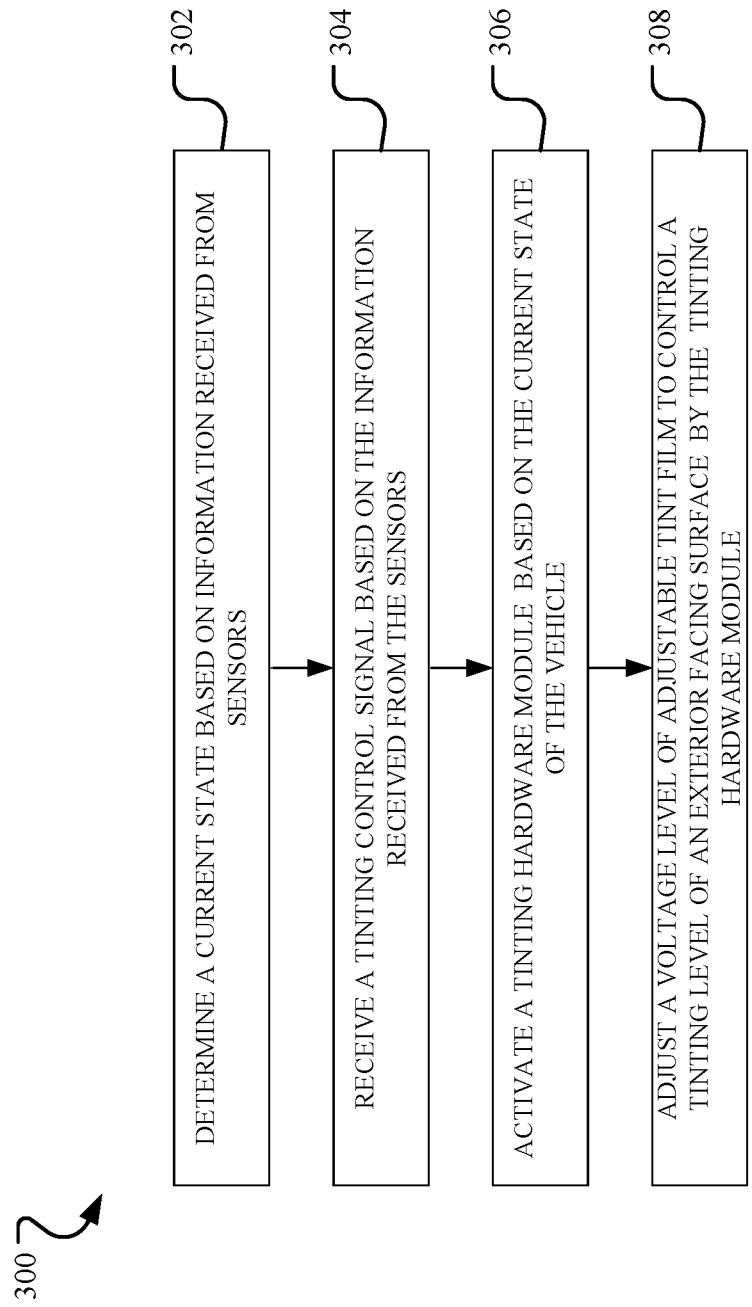
FIG. 3 illustrates a flowchart for activating and controlling adjustable tint film of a vehicle according to an example embodiment.

FIG. 3 illustrates a flowchart of a process 300 for activating and controlling adjustable tint film 104 according to an example embodiment. The process 300 shown in FIG. 3 begins at operation 302. In 302, the vehicle 102 determines a current state of the vehicle based on information received from the sensors 210, the imaging devices 212, and the GPS device 214. The current state of the vehicle 102 may include a current state of each zone 109 of the vehicle. The current state may be based on explicit commands and implicit commands in addition to tinting preferences of occupants 111 in the vehicle 102. The tinting sensors 210 and imaging devices 212 may execute a feedback loop and continually determine whether objects are located in each zone 109 of the vehicle 102 and determine whether any changes occur in the current state. Based on the feedback loop, the tinting hardware module 216 may provide anticipatory and responsive tinting that dynamically and automatically adjusts to the determined changes.

In 304, the tinting hardware module 216 receives a tinting control signal from the vehicle 102 based on the information received from the sensors 210, the imaging devices 212, and the GPS device 214. As an example, the sensors 210 and the imaging devices 212 may determine that a current state of the vehicle has changed in a zone 109 of the vehicle and a tinting hardware module 216 may be activated to change a tint level of exterior facing surfaces associated with an object, location, or zone 109 in the vehicle.

After determining that the current state of the vehicle has changed in a zone 109 of the vehicle, in 306, the vehicle 102 activates a tinting hardware module 216 based on the current state of the vehicle as determined by the sensors 210, the imaging devices 212, and the GPS device 314. As an example, an occupant 111 may have approached the vehicle, entered the vehicle, and sat down in a seat. The vehicle 102 may change a tint level of an exterior facing surface that protects and shields a location associated with the seat. In another example, the sensors 210 and the imaging devices 212 may detect that the occupant 111 has opened a book. In another example, the sensors 210 and the imaging devices 212 may detect that an occupant 111 has fallen asleep or is resting. As another example, the sensors 210 and the imaging devices 212 may detect that a child is crying. In a further example, an occupant 111 may have exited the vehicle. The sensors 210 and imaging devices 212 may detect that a heart rate of a passenger 111 is changing, may detect that eyes are closing, and may detect other changing biometric factors. The sensors and imaging devices 212 may detect the absence of the occupant 111 and may deactivate or activate the tinting hardware module 216 and modify a tint level of the adjustable tint film 104.

In 308, the tinting hardware module 216 adjusts a voltage level of the adjustable tint film 104 of an exterior facing surface to control a tinting level based on the tinting control signal. Based on the examples described above, if the occupant 111 has sat down in the seat, the tinting hardware module 216 may change a tint level of the adjustable tint film 104 of the exterior facing surface that is based on the personal tinting preferences of the occupant 111. If the occupant 111 has fallen asleep or the occupant is crying and sunlight or another type of light is shining on the occupant, the tinting hardware module 216 may gradually adjust the tint level. The adjustable tint film 104 may be activated based on one of an explicit command and an implicit command. In other words, the tinting control signal may be based on one of the explicit command and the implicit command.

The vehicle tinting application 206 may receive an explicit tinting command, and the explicit tinting command may be one of a gesture activated command, a voice activated command, and a touch command. In response to the command, the vehicle tinting application 206 activates the tinting hardware module 216 based on the explicit tinting command. The vehicle tinting application 206 also may receive an implicit command. The implicit command is based on a change in the current state. In response to the command, the vehicle tinting application 206 activates the tinting hardware module 216. Based on the explicit command and/or the implicit command, the tinting hardware module 216 controls a tinting level or a level of absorption of the adjustable tinting film 104 in an exterior facing surface of the vehicle 102. In another example, the implicit command may be based on intent of an occupant 111 based on eyes of an occupant 111, a head of an occupant 111, a hand of an occupant 111, a body position of an occupant 111, and a gaze of an occupant 111 as determined by the sensors 210 and the imaging devices 212. The sensors 210 and the imaging devices 212 may determine that the occupant 111 is squinting and uncomfortable due to sunlight 113 shining into the occupant's eyes. The sensors 210 and the imaging devices 212 also may determine that the occupant 111 is looking outside of the vehicle to observe scenery. The vehicle tinting application 206 may activate the tinting hardware module based on the intent of the occupant 111 or the perceived intent of the occupant. The intent may be determined by determining a vector from a finger or hand from the occupant 111 and/or a vector to the eyes of the occupant.

According to an exemplary embodiment, each exterior facing surface of the vehicle 102 may have an individually definable tinting level. This individually definable tinting level may be based on a variety of factors including the current state of the vehicle 102 in a particular location or zone 109, an occupant 111 located in a particular location or zone 109, and tinting profile preferences information, among other information. In addition, each exterior facing surface of the vehicle 102 may have further granular settings. Each exterior facing surface of the vehicle 102 may have multiple portions. Each portion of each exterior facing surface may have an individually definable tinting level. Thus, the vehicle tinting application 206 may adjust a first portion of a particular exterior facing surface to a first tinting level and adjust a second portion of the particular exterior facing surface to a second tinting level. The first tinting level may be different than the second tinting level or the first tinting level may be the same as the second tinting level. As an example, the first portion of the exterior facing surface may be an upper portion of a windshield on a front-left side of the vehicle, e.g., a driver seat. This first portion of the exterior facing surface may have a tinting level to protect the eyes of an occupant 111 sitting in the driver/operator seat. The second portion of the exterior facing surface may be a lower portion of the windshield on the front-left side of the vehicle. This second portion of the exterior facing surface may have a tinting level that is lower than the tinting level of the first portion. The occupant 111 may use this second portion of the exterior facing surface to view outside of the vehicle 102 and safely operate the vehicle.

In an even further embodiment, the vehicle tinting application 206 may adjust a first portion of a particular exterior facing surface to a first tinting level, adjust a second portion of the particular exterior facing surface to a second tinting level, and adjust a third portion of the particular exterior facing surface to a third tinting level. An exterior facing surface may have more than three portions and each may have an individually definable tinting level.

Additionally, the vehicle tinting application 206 may adjust a voltage level of the adjustable tint film 104 to control a tinting level of a mirror of the vehicle 102 by the tinting hardware module 216 based on the tinting control signal. Each mirror may have an individually definable tinting level. As an example, the vehicle 102 may be traveling at night and another vehicle behind the vehicle may be shining high intensity lights into the interior of the vehicle 102 such that the high intensity lights shine onto a rear-view mirror. The mirror may modify and control its tinting level such that an occupant of the vehicle is able to better utilize the mirror. The mirror also may be a mirror located on an exterior of the vehicle, such as a passenger side mirror or a driver side mirror.

The vehicle tinting application 206 also may adjust a diffuser of the vehicle 102. The vehicle tinting application 206 may adjust a voltage level of the adjustable tint film 104 to control a tinting level of the diffuser of the vehicle by the tinting hardware module 216 based on the tinting control signal. Each diffuser may have an individually definable tinting level. The diffuser may be associated with a surface within the vehicle, such as a surface for displaying a display.

Figure 4:
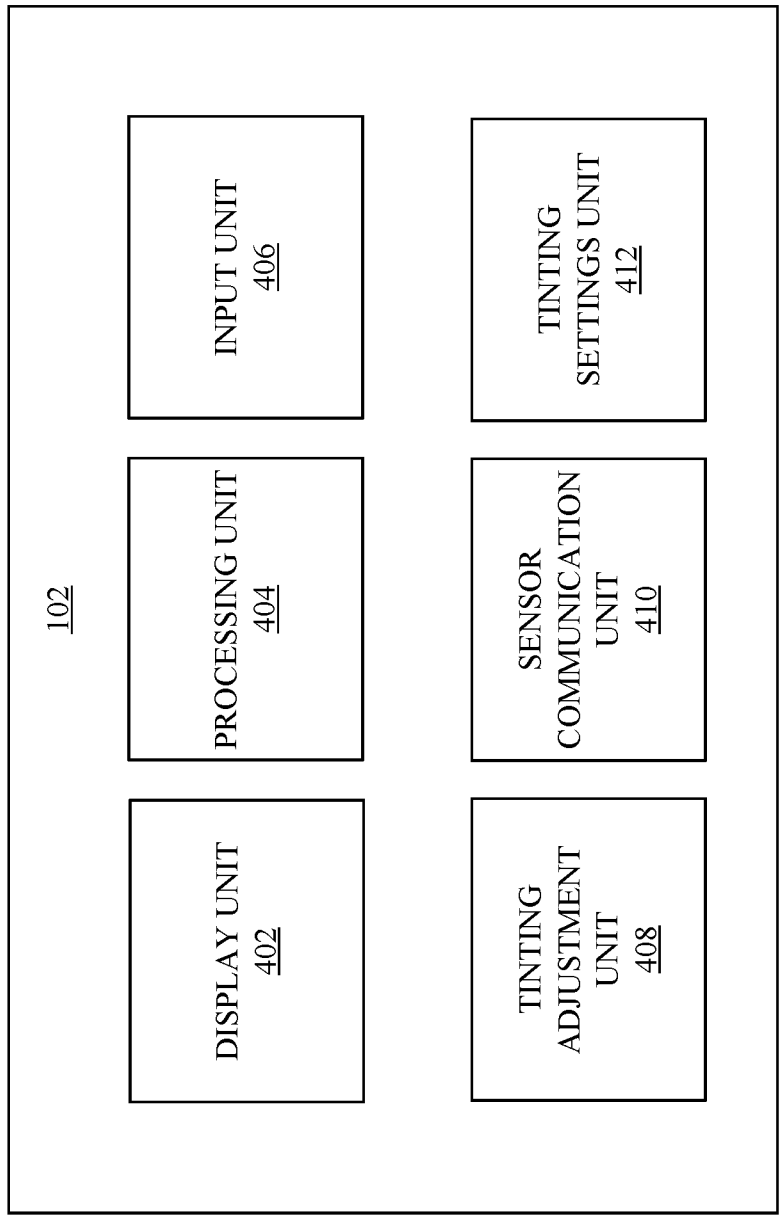
FIG. 4 illustrates a functional block diagram of an electronic device associated with the vehicle including operational units arranged to perform various operations of the presently disclosed technology.

Turning to FIG. 4, the vehicle 102 including operational units 402-412 arranged to perform various operations of the presently disclosed technology is shown. The operational units 402-412 may be provided by the vehicle tinting application 206 and may communicate with the mobile computing device. The operational units 402-412 of the vehicle 102 are implemented by hardware or a combination of hardware and software to carry out the principles of the present disclosure. It will be understood by persons of skill in the art that the operational units 402-412 described in FIG. 4 may be combined or separated into sub-blocks to implement the principles of the present disclosure. Therefore, the description herein supports any possible combination or separation or further definition of the operational units 402-412.

In one implementation, the vehicle 102 includes a display unit 402 configured to display information, such as a graphical user interface, and a processing unit 404 in communication with the display unit 402 and an input unit 406 configured to receive data from input devices or systems. Various operations described herein may be implemented by the processing unit 404 using data received by the input unit 406 to output information for display using the display unit 402.

Additionally, in one implementation, the vehicle 102 includes units implementing the operations described with respect to FIG. 3. For example, the operations 302, 304, 306, and 308 may be implemented by a tinting adjustment unit 408, a sensor communication unit 410, and a tinting settings unit 412. The tinting adjustment unit 408, the sensor communication unit 410, and the tinting settings unit 412 may together activate and control the tinting hardware module 216 based on explicit and implicit tinting commands. As an example, the tinting adjustment unit 408 may include an explicit tinting command unit and an implicit tinting command unit. The tinting settings unit 412 may include a personal tinting profile settings unit that determines personalized tinting settings for each occupant 111 of the vehicle 102 and determines current weather for a particular location of the vehicle and provides input to the tinting adjustment unit 408.

The sensor communication unit 410 may include a biometric authentication unit that communicates with the sensors 210 and the imaging devices 212. The biometric authentication unit may use a biometric matching engine for receiving biometric information from the sensors 210, the imaging devices 212, and comparing the biometric information with the information stored in the vehicle memory 204 and the memory in the processor 202. The biometric authentication unit determines whether the biometric information matches known biometric information (e.g., comparing the representation of a face to known faces) and provides a determination of match or no match. Each known face may be first stored when an occupant 111 approaches and/or enters the vehicle 102 or at another time. The biometric authentication unit may make the determination based on a particular location of the vehicle.

The sensor communication unit 410 also may include an object authentication unit that communicates with the sensors 210 and the imaging devices 212. The object authentication unit may use an object matching engine for receiving object information from the sensors 210, the imaging devices 212, and comparing the object information with the object information stored in the vehicle memory 204 and the memory in the processor 202. The object authentication unit determines whether the object information matches known object information (e.g., comparing a representation of a book with a known representation of a book) and provides a determination of match or no match. As a result, the object authentication unit and the biometric authentication unit provide machine learning capabilities for the vehicle 102.

Figure 5:
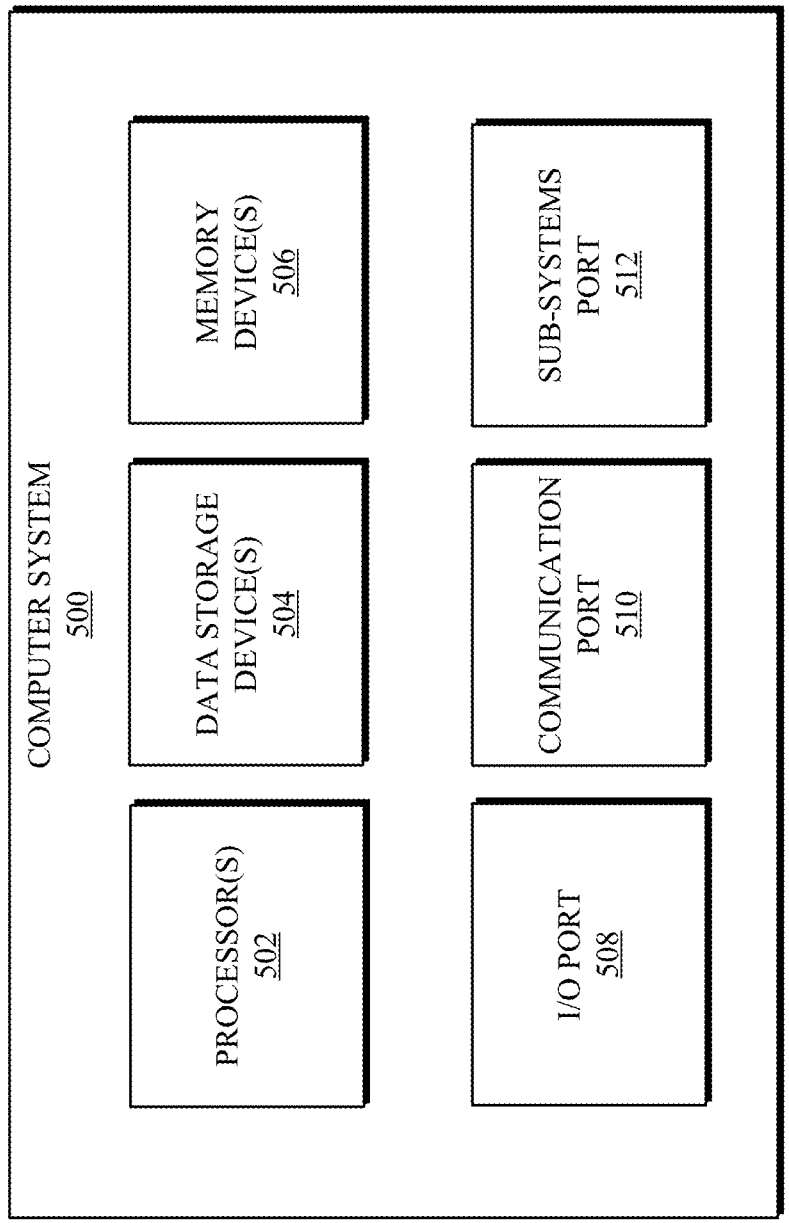
FIG. 5 is an example computing system that may implement various systems and methods of the presently disclosed technology.

Referring to FIG. 5, a detailed description of an example computing system 500 having computing units that may implement various systems and methods discussed herein is provided. The computing system 500 may be applicable to the vehicle 102 and the mobile computing device and other computing or network devices. It will be appreciated that specific implementations of these devices may be of differing possible specific computing architectures not all of which are specifically discussed herein but will be understood by those of ordinary skill in the art.

The computer system 500 may be a computing system that is capable of executing a computer program product to execute a computer process. Data and program files may be input to the computer system 500, which reads the files and executes the programs therein. Some of the elements of the computer system 500 are shown in FIG. 5, including hardware processors 502, data storage devices 504, memory devices 506, and/or ports 508-512. Additionally, other elements that will be recognized by those skilled in the art may be included in the computing system 500 but are not explicitly depicted in FIG. 5 or discussed further herein. Various elements of the computer system 500 may communicate with one another by way of communication buses, point-to-point communication paths, or other communication means not explicitly depicted in FIG. 5.

The processor 502 may include, for example, a central processing unit (CPU), a microprocessor, a microcontroller, a digital signal processor (DSP), and/or internal levels of cache. There may be processors 502, such that the processor 502 comprises a single central-processing unit, or processing units capable of executing instructions and performing operations in parallel with each other, commonly referred to as a parallel processing environment.

The computer system 500 may be a conventional computer, a distributed computer, or any other type of computer, such as external computers made available via a cloud computing architecture. The presently described technology is optionally implemented in software stored on the data storage device(s) 504, stored on the memory device(s) 506, and/or communicated via the ports 508-512, thereby transforming the computer system 500 in FIG. 5 to a special purpose machine for implementing the operations described herein. Examples of the computer system 500 include personal computers, terminals, workstations, mobile phones, tablets, laptops, personal computers, multimedia consoles, gaming consoles, set top boxes, and the like.

The data storage devices 504 may include any non-volatile data storage device capable of storing data generated or employed within the computing system 500, such as computer executable instructions for performing a computer process, which may include instructions of both application programs and an operating system (OS) that manages the various components of the computing system 500. The data storage devices 504 may include, without limitation, magnetic disk drives, optical disk drives, solid state drives (SSDs), flash drives, and the like. The data storage devices 504 may include removable data storage media, non-removable data storage media, and/or external storage devices made available via a wired or wireless network architecture with such computer program products, including database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The memory devices 506 may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in the data storage devices 504 and/or the memory devices 506, which may be referred to as machine-readable media. It will be appreciated that machine-readable media may include any tangible non-transitory medium that is capable of storing or encoding instructions to perform any of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the executable instructions or data structures.

In some implementations, the computer system 500 includes ports, such as an input/output (I/O) port 508, a communication port 510, and a sub-systems port 512, for communicating with other computing, network, or vehicle devices. It will be appreciated that the ports 508-512 may be combined or separate and that more or fewer ports may be included in the computer system 500.

The I/O port 508 may be connected to an I/O device, or other device, by which information is input to or output from the computing system 500. Such I/O devices may include, without limitation, input devices, output devices, and/or environment transducer devices.

In one implementation, the input devices convert a human-generated signal, such as, human voice, physical movement, physical touch or pressure, and/or the like, into electrical signals as input data into the computing system 500 via the I/O port 508. Similarly, the output devices may convert electrical signals received from computing system 500 via the I/O port 508 into signals that may be sensed as output by a human, such as sound, light, and/or touch. The input device may be an alphanumeric input device, including alphanumeric and other keys for communicating information and/or command selections to the processor 502 via the I/O port 508. The input device may be another type of user input device including, but not limited to: direction and selection control devices, such as a mouse, a trackball, cursor direction keys, a joystick, and/or a wheel; sensors, such as a camera, a microphone, a positional sensor, an orientation sensor, a gravitational sensor, an inertial sensor, and/or an accelerometer; and/or a touch-sensitive display screen ("touchscreen"). The output devices may include, without limitation, a display, a touchscreen, a speaker, a tactile and/or haptic output device, and/or the like. In some implementations, the input device and the output device may be the same device, for example, in the case of a touchscreen.

The environment transducer devices convert one form of energy or signal into another for input into or output from the computing system 500 via the I/O port 508. For example, an electrical signal generated within the computing system 500 may be converted to another type of signal, and/or vice-versa. In one implementation, the environment transducer devices sense characteristics or aspects of an environment local to or remote from the computing device 500, such as, light, sound, temperature, pressure, magnetic field, electric field, chemical properties, physical movement, orientation, acceleration, gravity, and/or the like. Further, the environment transducer devices may generate signals to impose some effect on the environment either local to or remote from the example computing device 500, such as, physical movement of some object (e.g., a mechanical actuator), heating or cooling of a substance, adding a chemical substance, and/or the like.

In one implementation, a communication port 510 is connected to a network by way of which the computer system 500 may receive network data useful in executing the methods and systems set out herein as well as transmitting information and network configuration changes determined thereby. Stated differently, the communication port 510 connects the computer system 500 to communication interface devices configured to transmit and/or receive information between the computing system 500 and other devices by way of wired or wireless communication networks or connections. Examples of such networks or connections include, without limitation, Universal Serial Bus (USB), Ethernet, Wi-Fi, Bluetooth®, Near Field Communication (NFC), Long-Term Evolution (LTE), and so on. Such communication interface devices may be utilized via the communication port 510 to communicate with other machines, either directly over a point-to-point communication path, over a wide area network (WAN) (e.g., the Internet), over a local area network (LAN), over a cellular (e.g., third generation (3G) or fourth generation (4G)) network, or over another communication means. Further, the communication port 510 may communicate with an antenna for electromagnetic signal transmission and/or reception. In some examples, an antenna may be employed to receive Global Positioning System (GPS) data to facilitate determination of a location of a machine, vehicle, or another device.

The computer system 500 may include a sub-systems port 512 for communicating with systems related to a vehicle to control an operation of the vehicle 102 and/or exchange information between the computer system 500 and sub-systems of the vehicle. Examples of such sub-systems of a vehicle, include, without limitation, imaging systems, radar, lidar, motor controllers and systems, battery control, fuel cell or other energy storage systems or controls in the case of such vehicles with hybrid or electric motor systems, autonomous or semi-autonomous processors and controllers, steering systems, brake systems, light systems, navigation systems, environment controls, entertainment systems, and the like.

In an example implementation, vehicle tinting information and software and other modules and services may be embodied by instructions stored on the data storage devices 504 and/or the memory devices 506 and executed by the processor 502. The computer system 500 may be integrated with or otherwise form part of a vehicle. In some instances, the computer system 500 is a portable device that may be in communication and working in conjunction with various systems or sub-systems of a vehicle.

The system set forth in FIG. 5 is but one possible example of a computer system that may employ or be configured in accordance with aspects of the present disclosure. It will be appreciated that other non-transitory tangible computer-readable storage media storing computer-executable instructions for implementing the presently disclosed technology on a computing system may be utilized.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium, optical storage medium; magneto-optical storage medium, read only memory (ROM); random access memory (RAM); erasable programmable memory (e.g., EPROM and EEPROM); flash memory; or other types of medium suitable for storing electronic instructions.

For the purpose of promoting an understanding of the principles of the present disclosure, reference was made to the embodiments illustrated in the drawings, and specific language was used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates.

While the present disclosure has been described with reference to various implementations, it will be understood that these implementations are illustrative and that the scope of the present disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A vehicle, comprising:
   a processor; and
   a non-transitory computer-readable medium storing instructions that, when executed by the processor, cause the processor to perform operations comprising:
   receiving a location of the vehicle;
   receiving tinting preferences of a user of the vehicle;
   in response to determining that the location is known to the vehicle, setting a first tinting level of a surface of the vehicle that matches the tinting preferences of the user of the vehicle; and
   in response to determining that the location is unknown to the vehicle, setting a second tinting level of the surface of the vehicle that differs from the first tinting level.

2. The vehicle of claim 1, wherein setting the first tinting level comprises:
   determining a tinting control signal; and
   adjusting a voltage level of an adjustable tint film of the surface to control the first tinting level of the surface based on the tinting control signal.

3. The vehicle of claim 1, wherein the surface of the vehicle is an exterior facing surface of the vehicle.

4. The vehicle of claim 3,
   wherein the exterior facing surface is associated with all zones within the vehicle,
   wherein determining that the location is known to the vehicle comprises identifying that the location is a parking garage, and
   wherein setting the first tinting level of the surface of the vehicle comprises reducing an amount of tint of the exterior facing surface.

5. The vehicle of claim 3,
   wherein the exterior facing surface is in one zone within a front of the vehicle,
   wherein determining that the location is unknown to the vehicle comprises identifying that the location is a city street, and
   wherein setting the second tinting level of the surface of the vehicle comprises increasing an amount of tint of the exterior facing surface.

6. The vehicle of claim 1, wherein the surface of the vehicle is associated with a storage area of the vehicle that is distinct from a passenger area of the vehicle.

7. The vehicle of claim 6, wherein setting the second tinting level of the surface of the vehicle comprises increasing an amount of tint of the surface associated with the storage area of the vehicle relative to an amount of tint of another surface of the vehicle that is associated with the passenger area of the vehicle.

8. The vehicle of claim 1, wherein the operations further comprise:

setting the first tinting level or the second tinting level of the surface of the vehicle based on factors associated with the location of the vehicle.

9. The vehicle of claim 8, wherein the factors associated with the location of the vehicle comprise at least one of a temperature at the location, weather conditions at the location, or a crime rate at the location.

10. A method, comprising:
identifying that a vehicle is parked in a known location or an unknown location;
in response to identifying that the vehicle is parked in the unknown location, setting a first tinting level of an exterior surface of the vehicle;
in response to detecting that a known user of the vehicle is approaching the vehicle while the vehicle is parked in the unknown location, setting a second tinting level of the exterior surface of the vehicle; and
in response to detecting that the vehicle is parked in the known location, setting the second tinting level of the exterior surface of the vehicle,
wherein the first tinting level of the exterior surface obstructs a view of an interior of the vehicle from an exterior of the vehicle, and
wherein the second tinting level of the exterior surface enables the view of the interior of the vehicle from the exterior of the vehicle.

11. The method of claim 10, wherein the vehicle is identified as parked in the known location based on determining that a current location of the vehicle is in a parking garage.

12. The method of claim 10, wherein detecting that the known user of the vehicle is approaching the vehicle comprises:
determining a proximity of a mobile computing device of the known user to the vehicle.

13. The method of claim 12, further comprising:
determining tinting preferences of the known user of the vehicle based on a communication received from the mobile computing device; and
setting a third tinting level of the exterior surface of the vehicle based on the tinting preferences of the known user of the vehicle by adjusting a voltage level of an adjustable tint film of the exterior surface.

14. The method of claim 10, further comprising:
identifying that an occupant is within an interior of the vehicle; and
setting a third tinting level of the exterior surface of the vehicle to obstruct a view of the interior of the vehicle.

15. A vehicle comprising:
a processor configured to:
determine, based on information from sensors of the vehicle, that the vehicle is approaching a future location experiencing a future weather condition that differs from a current weather condition at a current location of the vehicle;
in response to determining that less ambient light will enter the vehicle at the future location due to the future weather condition than enters at the current location of the vehicle due to the current weather condition, determine a tinting control signal to allow more ambient light to enter the vehicle through an exterior facing surface of the vehicle at the future location experiencing the future weather condition; and
send a command to a tinting module to adjust a voltage level of an adjustable tint film to control a tinting level of the exterior facing surface of the vehicle based on the tinting control signal.

16. The vehicle of claim 15, wherein the processor is further configured to:
determine the current location of the vehicle based on information from the sensors comprising a global positioning system (GPS) hardware device.

17. The vehicle of claim 15, wherein the future weather condition is one of a rainstorm or a snowstorm.

18. The vehicle of claim 15, wherein the processor is further configured to:
determine a proximity of a mobile computing device to the vehicle; and
adjust the voltage level of the adjustable tint film based on the proximity.

19. The vehicle of claim 18, wherein the processor is further configured to:
determine tinting preferences of an occupant of the vehicle based on a communication received from the mobile computing device; and
adjust the voltage level of the adjustable tint film further based on the tinting preferences of the occupant of the vehicle.

20. The method of claim 10, wherein the vehicle is identified as parked in the unknown location based on determining that a current location of the vehicle is on a city street.

* * * * *